(12) United States Patent
Delmonte et al.

(10) Patent No.: US 8,161,461 B2
(45) Date of Patent: Apr. 17, 2012

(54) SYSTEMS AND METHODS FOR EVALUATING CODE USAGE

(75) Inventors: Janis Delmonte, Farmers Branch, TX (US); Joe Douglas Bolding, Allen, TX (US); Daniel G. Tormey, Rockwall, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1683 days.

(21) Appl. No.: 11/089,109

(22) Filed: Mar. 24, 2005

(65) Prior Publication Data

US 2006/0218535 A1  Sep. 28, 2006

(51) Int. Cl.
 *G06F 9/44* (2006.01)
(52) U.S. Cl. ...................................... 717/127
(58) Field of Classification Search ............ 717/127, 717/128
 See application file for complete search history.

(56) References Cited

U.S. PATENT DOCUMENTS

| | | | | |
|---|---|---|---|---|
| 4,958,275 A * | 9/1990 | Yokouchi | ............. | 712/225 |
| 5,485,574 A * | 1/1996 | Bolosky et al. | ............. | 714/35 |
| 5,878,208 A * | 3/1999 | Levine et al. | ............. | 714/38 |
| 6,594,824 B1 * | 7/2003 | Volkonsky et al. | ............. | 717/159 |
| 6,934,935 B1 * | 8/2005 | Bennett et al. | ............. | 717/127 |
| 6,993,696 B1 * | 1/2006 | Tanizaki et al. | ............. | 714/744 |
| 7,146,607 B2 * | 12/2006 | Nair et al. | ............. | 717/151 |
| 7,269,824 B2 * | 9/2007 | Noy et al. | ............. | 717/127 |
| 2002/0083306 A1 * | 6/2002 | Pessolano et al. | ............. | 712/220 |
| 2004/0123084 A1 * | 6/2004 | DeWitt et al. | ............. | 712/227 |
| 2005/0050524 A1 * | 3/2005 | Booker et al. | ............. | 717/130 |
| 2005/0071515 A1 * | 3/2005 | DeWitt et al. | ............. | 710/1 |
| 2005/0071816 A1 * | 3/2005 | Levine et al. | ............. | 717/127 |
| 2005/0120254 A1 * | 6/2005 | Suzuoki et al. | ............. | 713/320 |
| 2005/0210452 A1 * | 9/2005 | Dimpsey et al. | ............. | 717/120 |
| 2005/0240896 A1 * | 10/2005 | Wu et al. | ............. | 717/100 |
| 2006/0026388 A1 * | 2/2006 | Karp et al. | ............. | 712/24 |

* cited by examiner

*Primary Examiner* — Anna Deng

(57) ABSTRACT

In one embodiment, a method for evaluating code usage includes monitoring instructions executed by a processor, counting instances of execution of each instruction, correlating the executed instructions with source code instructions, and providing an indication of source code usage to a user.

18 Claims, 4 Drawing Sheets

SYSTEMS AND METHODS FOR EVALUATING CODE USAGE

BACKGROUND

It is often useful to profile a program to collect information about code execution within the program. For instance, it may be desirable to collect information about what portions of code are executed most frequently. With such information, the program developer can focus his or her optimization efforts on the code "hot spots" with the goal of increasing program performance. Such optimization may include, for example, creation of more efficient function calls or, in certain situations, elimination of function calls in favor of inline code.

Currently, profiler utilities are used to provide information about code usage. Such profiler utilities typically monitor execution of a program under evaluation to identify the number of times each program function is called during that execution. For example, a profiler utility may periodically sample the stack trace to identify what function calls are being made at each periodic instance. From this sampling, the profiler utility can obtain an indication as to what functions are called most frequently.

Although profiler utilities provide some indication as to code usage, this solution typically requires recompiling of the code and insertion of tracking instructions (i.e., instrumentation of the code). Such instrumentation requires additional work from the program developer and adds overhead to the code. In addition, although profiler utilities detect when a given function is called, they typically cannot determine which particular instructions of the function are actually executed. Therefore, a situation can arise in which, although only a few lines of code of a given function are frequently executed, the profiler utility cannot specifically identify those lines. Further, because such profiler utilities only periodically sample the stack trace, they do not provide an exact indication as to what code portions are being executed with the highest frequency. Moreover, profiler utilities normally cannot be used until the underlying code system is completed and running.

SUMMARY

Disclosed are systems and methods for evaluating code usage. In one embodiment, a method for evaluating code usage includes monitoring instructions executed by a processor, counting instances of execution of each instruction, correlating the executed instructions with source code instructions, and providing an indication of source code usage to a user.

BRIEF DESCRIPTION OF THE DRAWINGS

The systems and methods of this disclosure can be better understood with reference to the following drawings. The components in the drawings are not necessarily to scale.

DETAILED DESCRIPTION

As is described above, known code usage evaluation techniques comprise several drawbacks. As is described in the following, however, at least some of the drawbacks can be avoided by monitoring each instruction that is executed by a processor. Through such monitoring, a more accurate indication of code execution can be obtained without code instrumentation and before an underlying system is completed. From that information, the program developer can, if desired, optimize the program to increase its performance.

Figure 1:
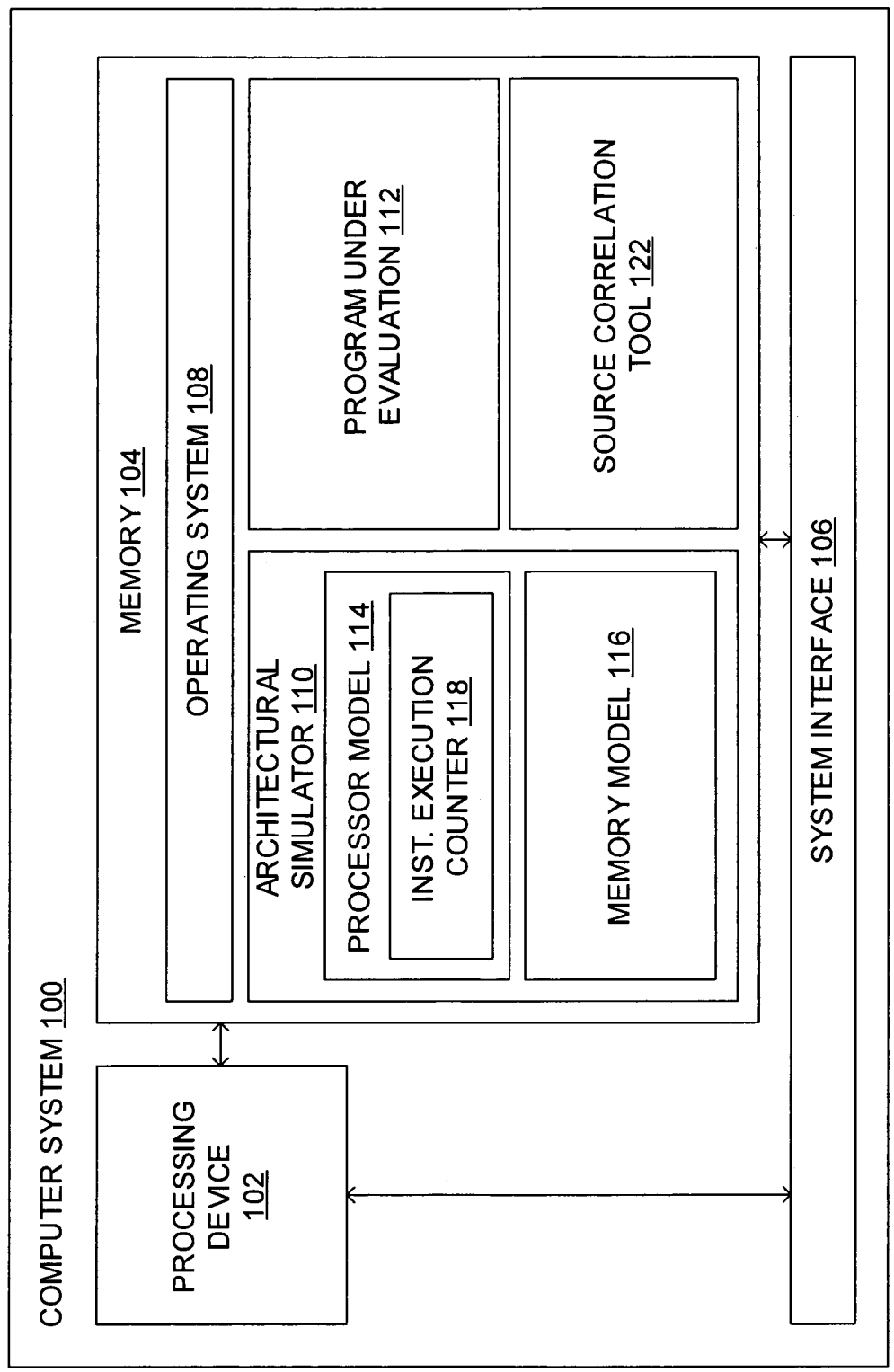
FIG. 1 is a block diagram of an embodiment of a computer system in which code usage can be evaluated.

Referring now to the figures, in which like numerals identify corresponding parts, FIG. 1 illustrates a computer system 100 in which code usage can be evaluated. The computer system 100 can, for example, comprise a common computer, such as a server, a desktop computer (e.g., IBM- or Macintosh-compatible), or a laptop computer.

As is indicated in FIG. 1, the computer system 100 includes a processing device 102 that comprises, for instance, a custom-made or commercially-available processor, a central processing unit (CPU), or a semiconductor-based microprocessor. In addition, the computer system 100 includes memory 104 that can include one or more volatile memory elements (e.g., read access memory (RAM)) and one or more nonvolatile memory elements (e.g., flash memory, magnetic RAM (MRAM), etc.). Furthermore, the computer system 100 comprises an interface 106 that includes one or more input/output (I/O) components that enable the computer system to communicate with human beings or other devices. Those components may comprise, for example, a keyboard and mouse, a parallel port, a small computer system interface (SCSI), a network card, and the like.

As is further illustrated in FIG. 1, the memory 104 comprises various programs, for example in software, including an operating system 108 and an architectural simulator 110. The operating system 108 controls the execution of other programs and provides scheduling, input-output control, file and data management, memory management, and communication control and related services. The architectural simulator 110 comprises the various code that simulates a given hardware platform. With such a simulator 110, various programs, such as a program under evaluation 112, can be run in a simulated hardware environment. The program under evaluation 112 comprises a binary file that can be loaded into the memory model 116, from which the program is run by the architectural simulator 110. The binary file is created by compiling the source code of the program under evaluation. That compiling can be performed with debugging information enabled. In such a case, the binary file comprises coded information that correlates the machine code with the source code from which it was derived. By way of example, the correlation information is presented in DWARF2 or Stabs format.

By way of example, the architectural simulator 110 simulates substantially every aspect of an underlying hardware platform. As is shown in FIG. 1, the architectural simulator 110 at least comprises a processor model 114 and a memory model 116. As their names suggest, the processor model 114 models the functionality of a processor of the simulated hardware, while the memory model 116 models the functionality of memory of the simulated hardware. In the embodiment of FIG. 1, the processor model 114 includes an instruction execution counter 118 that monitors execution of instructions of the program under evaluation 112 by the processor model.

After the instruction execution counter 118 determines the number of times each instruction is executed by the processor model 114, a source correlation tool 122 can provide the program developer with an indication of which lines of the source code are executed most frequently through cross-reference to the binary file of the program under evaluation 112. Therefore, it can be appreciated that the instruction execution counter 118 and the source correlation tool 122 together comprise a system for evaluating code usage. Notably, the source correlation tool 122 can be provided in a different location than that indicated in FIG. 1.

It is noted that the programs (i.e., logic) described above can be stored on any computer-readable medium for use by or in connection with any computer-related system or method. In the context of this document, a computer-readable medium is an electronic, magnetic, optical, or other physical device or means that can contain or store a computer program for use by or in connection with a computer-related system or method. The programs can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

Example systems having been described above, example methods for evaluating code usage will now be described. In the discussions that follow, flow diagrams are provided. Process steps or blocks in these flow diagrams may represent modules, segments, or portions of code that include one or more executable instructions for implementing specific logical functions or steps in the process. Although particular example process steps are described, alternative implementations are feasible. For instance, some steps may be executed out of order from that shown and discussed depending on the functionality involved.

Figure 2:
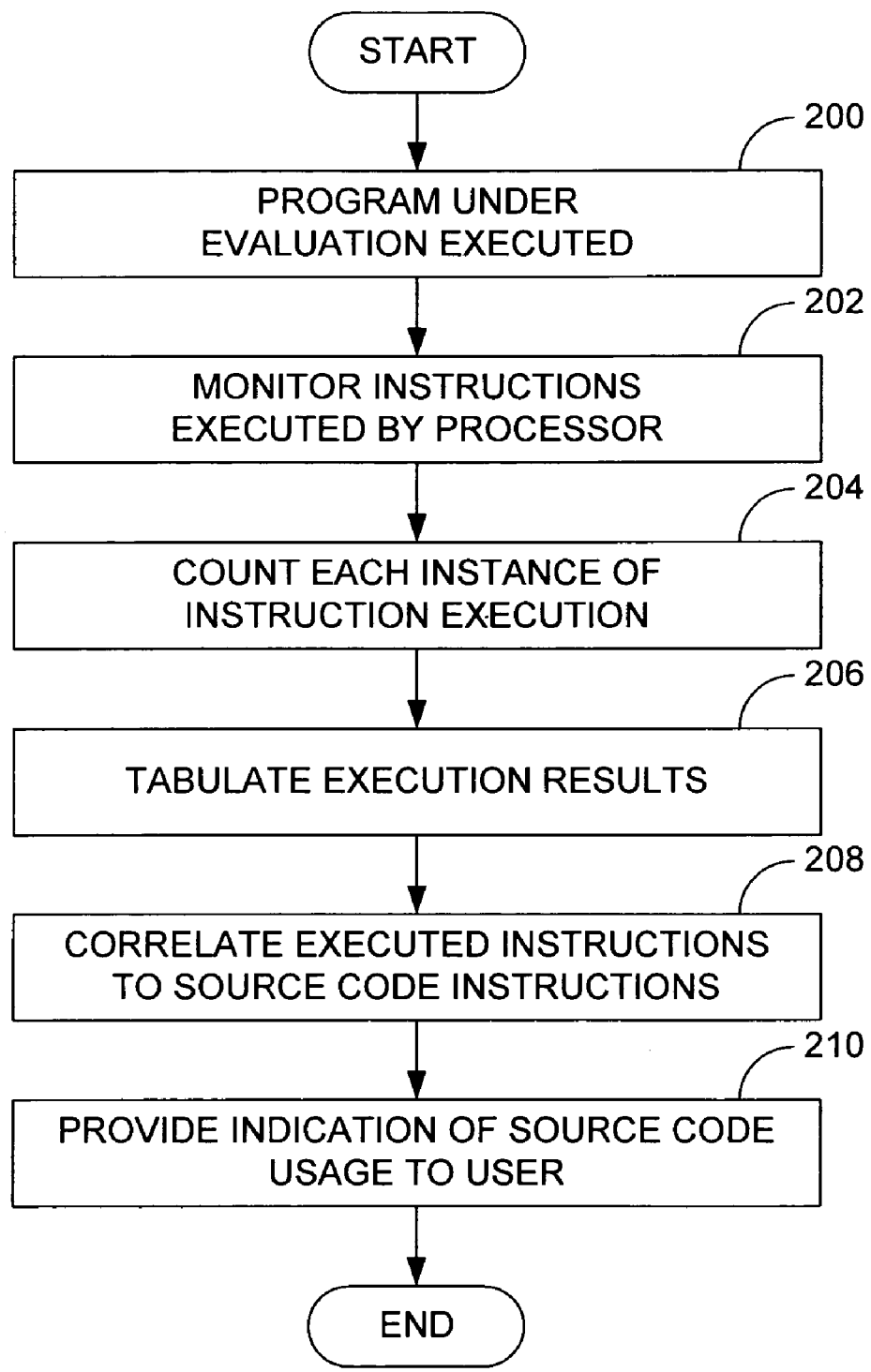
FIG. 2 is a flow diagram of an embodiment of a method for evaluating code usage.

FIG. 2 provides an overview of an embodiment of evaluating code usage. Beginning with block 200, the program under evaluation is executed. Such execution may comprise execution of the program instructions on an actual, physical system. In the example embodiment of FIG. 1, however, the program is executed on the architectural simulator 110 by the processor model 114. Therefore, from the program's perspective, the program is being run on the hardware that the simulator 110 simulates.

The instructions that are executed by the processor model 114 are monitored, as indicated in block 202. As is described above, this monitoring can be performed by the instruction execution counter 118 that is incorporated into the processor model 114 (FIG. 1). In such a case, the execution counter 118 has intimate knowledge of the instructions that are executed by the processor model 114.

With reference to block 204, each instance of execution of each instruction is counted. Again, this counting can be performed by the instruction execution counter 118 (FIG. 1). Through such counting, each instance of execution of each instruction is identified and recorded.

As is indicated in block 206, the results obtained from the counting can be tabulated. By way of example, the results are tabulated in a hash table that identifies each instruction that was executed, as well as the number of times each instruction was executed. This table, therefore, provides both an indication of code coverage (i.e., which program instructions were executed) and the frequency of code usage (i.e., how many times each of those instructions was executed).

Next, with reference to block 208, the executed instructions are correlated to the source code instructions to which they pertain. Typically, each source code instruction will be associated with multiple machine code instructions that are generated during compilation. By way of example, the correlation can be performed by the source correlation tool 122 (FIG. 1) by accessing both the tabulated results and the binary file of the program under evaluation 112 (FIG. 1).

After the executed instructions are correlated to the source code instructions, an indication of source code usage can be provided to the user, as indicated in block 210. That indication can take several different forms. For example, the indication can comprise a listing of each source code instruction that was implicated, along with an indication of the number of times that machine code instructions associated with that source code instruction were executed. Alternatively, lines of the source code can be produced using color coding that provides an indication of the number of times each source code instruction was implicated. In such a case, frequently used, or "hot," instructions can be indicated in a first color font, infrequently used instructions can be indicated in a second color font, and so forth.

Figure 3:
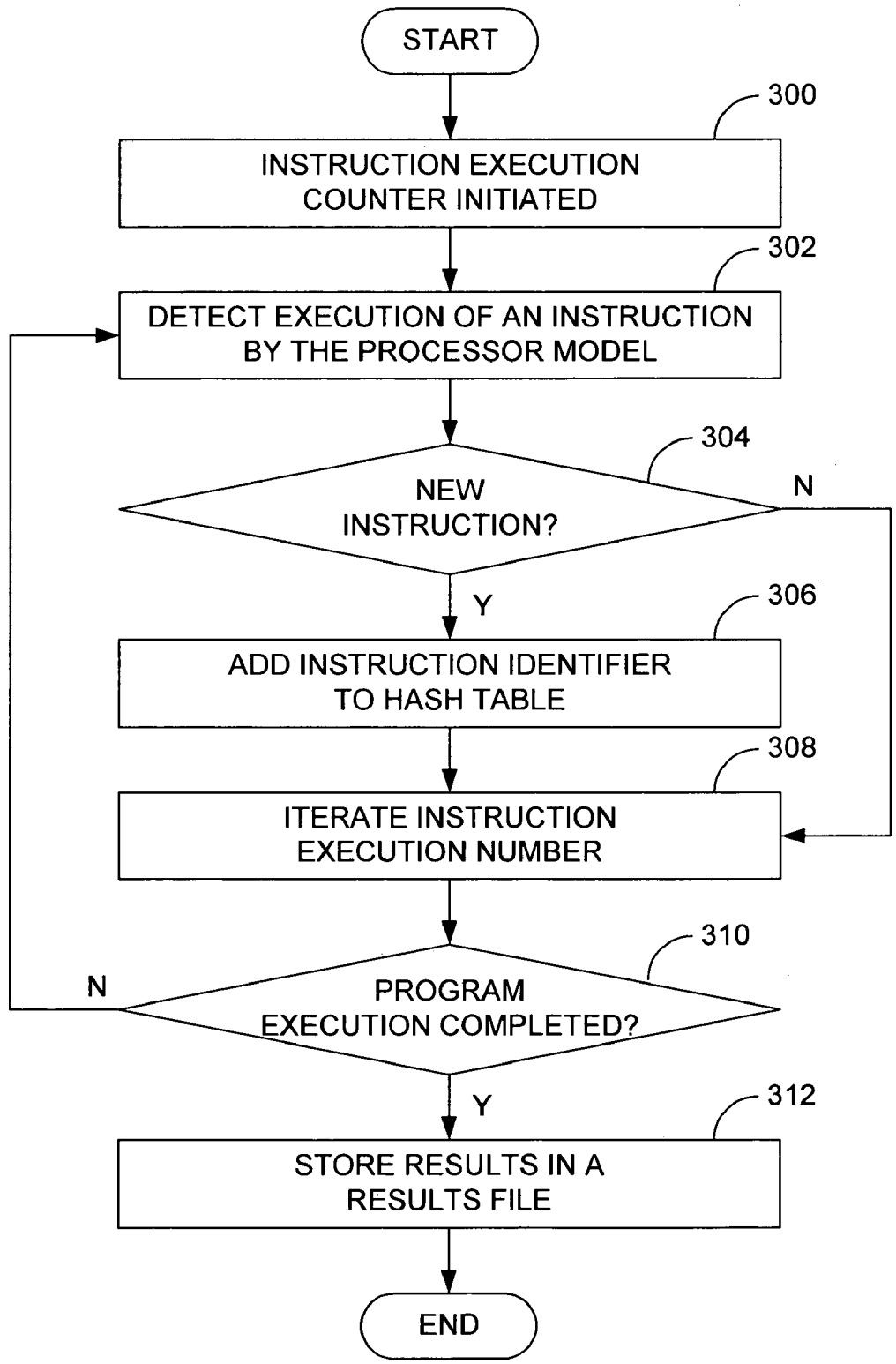
FIG. 3 is a flow diagram of an embodiment of operation of an instruction execution counter shown in FIG. 1.

FIG. 3 provides an example of operation of the instruction execution counter 118 shown in FIG. 1. Beginning with block 300, the instruction execution counter 118 is initiated. This initiation can occur in various ways. By way of example, the instruction execution counter 118 is initiated simultaneous to initiation of the processor model 114 such that every instruction that is executed by the model is observed and counted. Alternatively, the instruction execution counter 118 can be initiated simultaneous to initiation of execution of a program (e.g., the program under evaluation 112, FIG. 1) that is to be evaluated for hot spots.

Irrespective of the manner in which the instruction execution counter 118 is initiated, the counter detects execution of an instruction by the processor model 114. As is identified above, this detection is facilitated by the instruction execution counter's relationship to the processor model 114. In particular, because the instruction execution counter 118 forms part of the processor model 114, the counter directly "sees" all instructions that are executed by the processor model. More particularly, the instruction execution counter 118 sees the address (actual or virtual) of each instruction that the processor model 114 executes.

Referring to decision block 304, the instruction execution counter 118 determines whether the detected instruction is a new instruction. In other words, the instruction execution counter 118 determines whether the instruction that the processor model 114 just executed had been previously executed by the processor model in the current program execution session. That determination can be made with reference to the hash table described in relation to FIG. 4. Specifically, the instruction execution counter 118 can look up the address of the executed instruction in the hash table to determine whether an entry for that instruction already exists. If not, the instruction is new, and flow continues down to block 308 described below.

With continued reference to block 304, if the instruction is new, flow continues to block 306 at which the instruction execution counter 118 adds the instruction to the hash table. More particularly, the instruction execution counter 118 adds an identifier to the hash table, such as the instruction address, that uniquely identifies the instruction. In addition, the instruction execution counter 118 iterates an instruction execution count, as indicated in block 308, so as to record the most recent (possibly first) instance of execution of the instruction at issue.

Referring next to decision block 310, flow from this point depends upon whether program execution has been completed. If program execution is not finished, flow returns to block 302 at which the instruction execution counter 118 detects execution of the next instruction. If execution is finished, however, there are no more instructions to be executed by the processor model 114, or counted by the instruction execution counter 118.

At this point, the results of the counting (i.e., the number of times each instruction was executed) is stored to a results file in memory (e.g., a disk of memory 104).

Figure 4:
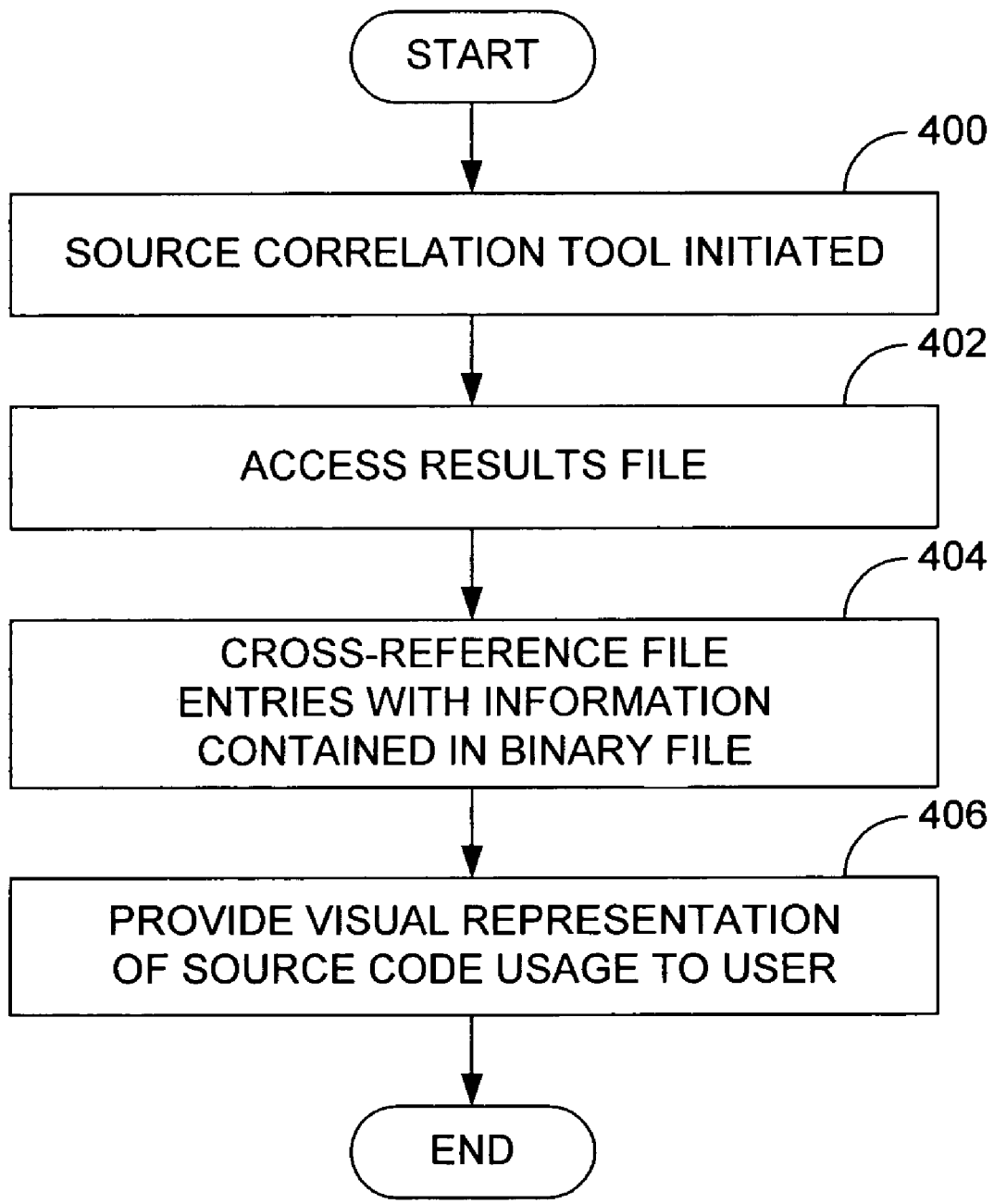
FIG. 4 is a flow diagram of an embodiment of operation of a source correlation tool shown in FIG. 1.

Referring to FIG. 4, an example of operation of the source correlation tool 122 will be discussed. Beginning with block 400, the source correlation tool 122 is initiated. By way of example, the initiation occurs automatically, for example in response to a call from the instruction execution counter 118 indicating that the program execution session has been completed and that the hash table is completed. Alternatively, the initiation can occur in response to manual activation of the source correlation tool 122 by a user (e.g., program developer).

Once initiated, the source correlation tool 122 accesses the results file that was output after counting was completed (see block 312, FIG. 3), as indicated in block 402, and cross-references the file entries (i.e., instruction entries) with the information contained in the binary file of the program under evaluation 112, as indicated in block 404. Through that cross-referencing, the source correlation tool 122 can determine which source code instructions were implicated in the program execution session. In that process, the source correlation tool 122 decodes at least a portion of the correlation information (e.g., provided as debugging information) contained in the binary file. With that correlation information, the source correlation tool 122 can determine to which source code lines the various machine code instructions contained in the result files pertain, and can therefore determine how many times the source code lines were implicated. For example, the source correlation tool 122 can determine the first machine code instruction of a line of source code and count how many times that instruction was executed during the session. That number would indicate how many times the line of source code was executed. Whether that number reflects a large number of times or a small number of times may depend upon the particular program at issue, the duration it was executed, or the number of times other source code instructions were implicated.

At this point, the source correlation tool 122 provides a visual representation of the source code usage to the user (e.g., program developer), as indicated in block 406. As is mentioned above, the nature of that representation can vary. In one embodiment, the entire source code program is presented to the user with the implicated lines of code being highlighted in some manner (e.g., highlighting, bolding, different color, etc.), and the number of times each was implicated listed beside or after the lines. In another embodiment, only the implicated lines of code are presented to the user, and the amount of usage of each instruction is indicated using a particular color code. For example, the relative amount of usage can be indicated with a spectrum of colors including purple, blue, green, yellow, orange, and red with blue indicating the lowest amount of usage and red indicating the largest amount of usage (i.e., hot spots). Myriad other visual representations are, of course, possible. The particular nature of the representation is less important than the underlying information that is being conveyed.

From the foregoing, it can be appreciated that the instruction execution counter 118 and the source correlation tool 122 together provide the user with a precise indication of both code coverage (i.e., which instructions are executed) and frequency of code usage (i.e., how many times each instruction is executed). Instead of extrapolating this information from monitoring function calls, each actual instance of instruction execution is detected and recorded to provide an accurate indication of code usage. Notably, this indication is provided without the need to instrument the code and without the need for an actual, physical underlying system to be in existence. Such code evaluation can be used on substantially any code, including firmware (e.g., basic input/output system (BIOS)), and software (e.g., operating system (O/S), application programs).

What is claimed is:

1. A method for evaluating code usage, the method comprising:
    monitoring of instructions executed by a processor;
    counting instances of execution of each of the instructions, wherein the counting further comprises:
        determining whether an instruction of the instructions is a new instruction by look up identifiers of executed instructions in a hash table, wherein the identifiers indicate memory addresses of the executed instructions;
        in response to the determination that the instruction is new, adding the instruction to the hash table with an identifier indicates memory address of the instruction;
        iterating an instruction execution count of the instruction to record a most recent instance of execution of the instruction to the hash table; and
        tabulating each instance of the execution of the instruction in the hash table;
    correlating the executed instructions with source code instructions;
    providing from the correlating an indication of source code usage to a user; and
wherein no code is added to the program to facilitate monitoring.

2. The method of claim 1, wherein the monitoring comprises monitoring of a memory address of each executed instruction.

3. The method of claim 2, wherein the monitoring of a memory address comprises monitoring an actual hardware address of each executed instruction.

4. The method of claim 2, wherein the monitoring of a memory address comprises monitoring a virtual address of each of the executed instructions in a simulated hardware environment.

5. The method of claim 1, wherein the monitoring of instructions comprises monitoring instructions executed by a processor model that simulates operation of an actual, physical processor.

6. The method of claim 5, wherein the counting instances of execution comprises counting instances of execution using a counter that comprises part of the processor model.

7. The method of claim 1, wherein correlating the executed instructions comprises cross-referencing a record of the executed instructions with a binary file for a source program.

8. The method of claim 1, wherein providing an indication of source code usage comprises providing a visual representation of the source code's usage.

9. The method of claim 8, wherein providing a visual representation comprises providing a list of source code instructions along with an indication of the number of times each instruction was implicated.

10. The method of claim 9, wherein the providing an indication of the number of times each instruction was implicated comprises explicitly identifying the number of times each source code instruction was implicated.

11. The method of claim 9, wherein the providing an indication of the number of times each instruction was implicated comprises using color coding that indicates the frequency with which each instruction was implicated.

12. A computer-readable medium comprising:
an instruction execution counter configured to monitoring instructions of a program executed by a processor without the assistance of code that has added to the program and to count instances of execution of each instruction, wherein the count instances of execution of each instruction further comprises:
determining whether an instruction of the instructions is a new instruction by look up identifiers of executed instructions in a hash table, wherein the identifiers indicate memory addresses of the executed instructions;
in response to the determination that the instruction is new, adding the instruction to the hash table with an identifier indicates memory address of the instruction;
iterating the instruction execution count for the instruction to record a most recent instance of execution of the instruction to the hash table; and
tabulating each instance of the execution of the instruction in the hash table; and
a source correlation tool configured to correlate the executed instructions with source code instructions and to provide an indication of source code usage to a user.

13. The computer-readable medium of claim 12, wherein the instruction execution counter is configured to monitor a memory address of each executed instruction.

14. The computer-readable medium of claim 12, wherein the instruction execution counter forms part of a processor model of an architectural simulator that simulates a hardware platform.

15. The computer-readable medium of claim 12, wherein the source correlation tool is configured to cross-reference a record of the executed instructions with a binary file for a source program.

16. The computer-readable medium of claim 12, wherein the source correlation tool is configured to provide a list of source code instructions to the user along with an indication of the number of times each instruction was implicated.

17. A computer system, comprising:
a processing device; and
memory that includes a program under evaluation and an architectural simulator configured to simulate operation of a hardware platform, the architectural simulator comprising a processor model configured to simulate operation of a processor of the simulated hardware platform, the processor model comprising an instruction execution counter that is configured to monitor instructions executed by the processor model and count instances of execution of each instruction, wherein the instruction execution counter monitors the instructions and counts instances of their execution without the assistance of profiling code that has been added to the program, and wherein the instruction execution counter is configured to carry out the steps of:
determining whether an instruction of the instructions is a new instruction by look up identifiers of executed instructions in a hash table, wherein the identifiers indicate memory addresses of the executed instructions;
in response to the determination that the instruction is new, adding the instruction to the hash table with an identifier indicates memory address of the instruction;
iterating an instruction execution count of the instruction to record a most recent instance of execution of the instruction to the hash table; and
tabulating each instance of the execution of the instruction in the hash table; and
a source correlation tool configured to correlate the executed instructions with source code instructions and to provide an indication of source code usage to a user.

18. The system of claim 17, further comprising a binary file that correlates machine code instructions with source code instructions.

* * * * *

UNITED STATES PATENT AND TRADEMARK OFFICE
CERTIFICATE OF CORRECTION

| | | |
|---|---|---|
| PATENT NO. | : 8,161,461 B2 | Page 1 of 1 |
| APPLICATION NO. | : 11/089109 | |
| DATED | : April 17, 2012 | |
| INVENTOR(S) | : Janis Delmonte et al. | |

It is certified that error appears in the above-identified patent and that said Letters Patent is hereby corrected as shown below:

In column 6, line 10, in Claim 1, delete "of instructions executed" and insert -- instructions of a program executed --, therefor.

In column 7, line 2, in Claim 12, delete "monitoring" and insert -- monitor --, therefor.

In column 8, line 11, in Claim 17, after "instructions" insert -- of the program --.

Signed and Sealed this
Nineteenth Day of March, 2013

Teresa Stanek Rea
*Acting Director of the United States Patent and Trademark Office*